US009047866B2

(12) United States Patent
Koval

(10) Patent No.: US 9,047,866 B2
(45) Date of Patent: Jun. 2, 2015

(54) SYSTEM AND METHOD FOR IDENTIFICATION OF A SPEAKER BY PHONOGRAMS OF SPONTANEOUS ORAL SPEECH AND BY USING FORMANT EQUALIZATION USING ONE VOWEL PHONEME TYPE

(75) Inventor: Sergey Lvovich Koval, Saint-Petersburg (RU)

(73) Assignee: Speech Technology Center Limited, Saint-Petersburg (RU)

( * ) Notice: Subject to any disclaimer, the term of this patent is extended or adjusted under 35 U.S.C. 154(b) by 103 days.

(21) Appl. No.: 13/429,260

(22) Filed: Mar. 23, 2012

(65) Prior Publication Data

US 2012/0232899 A1 Sep. 13, 2012

Related U.S. Application Data

(63) Continuation of application No. PCT/RU2010/000661, filed on Nov. 3, 2010.

(30) Foreign Application Priority Data

Sep. 24, 2009 (RU) .................... 2009136387

(51) Int. Cl.
*G10L 15/00* (2013.01)
*G10L 17/14* (2013.01)
(Continued)

(52) U.S. Cl.
CPC ............... *G10L 17/14* (2013.01); *G10L 17/02* (2013.01); *G10L 25/15* (2013.01); *G10L 17/06* (2013.01); *G10L 17/20* (2013.01)

(58) Field of Classification Search
CPC ........ G10L 15/00; G10L 15/10; G10L 15/265
USPC ......................... 704/246, 241, 238
See application file for complete search history.

(56) References Cited

U.S. PATENT DOCUMENTS 3,466,394 A 9/1969 French
3,700,815 A * 10/1972 Doddington et al. ......... 704/246
(Continued)

FOREIGN PATENT DOCUMENTS

DE 2431458 A1 5/1976
RU 2047912 C1 11/1995
(Continued)

OTHER PUBLICATIONS

Pnoneme Based Speaker Verification "Acoustics, Speech, and Signal Processing, 1992. ICASSP-92, 1992 IEEE International Conference, M. Savic, J. Sorensen".*
(Continued)

*Primary Examiner* — Farzad Kazeminezhad
(74) *Attorney, Agent, or Firm* — Knobbe Martens Olson & Bear, LLP

(57) ABSTRACT

A system and method for identification of a speaker by phonograms of oral speech is disclosed. Similarity between a first phonogram of the speaker and a second, or sample, phonogram is evaluated by matching formant frequencies in referential utterances of a speech signal, where the utterances for comparison are selected from the first phonogram and the second phonogram. Referential utterances of speech signals are selected from the first phonogram and the second phonogram, where the referential utterances include formant paths of at least three formant frequencies; wherein the first two formants are within typical variability limits for one vowel phoneme type. The selected referential utterances including at least two identical formant frequencies are compared therebetween. Similarity of the compared referential utterances from matching other formant frequencies is evaluated, where similarity of the phonograms is determined from evaluation of similarity of all the compared referential utterances.

15 Claims, 11 Drawing Sheets

(51) Int. Cl.
 *G10L 17/02* (2013.01)
 *G10L 25/15* (2013.01)
 *G10L 17/06* (2013.01)
 *G10L 17/20* (2013.01)

(56) References Cited

U.S. PATENT DOCUMENTS

| | | |
|---|---|---|
| 5,265,191 A | 11/1993 | McNair |
| 5,313,556 A | 5/1994 | Parra |
| 5,339,385 A | 8/1994 | Higgins |
| 5,995,927 A | 11/1999 | Li |
| 6,389,392 B1 | 5/2002 | Pawlewski et al. |
| 6,411,930 B1 | 6/2002 | Burges |
| 6,993,378 B2 * | 1/2006 | Wiederhold et al. .......... 600/509 |
| 2007/0027579 A1 * | 2/2007 | Suzuki et al. ................. 700/245 |
| 2010/0217591 A1 * | 8/2010 | Shpigel ........................ 704/235 |

FOREIGN PATENT DOCUMENTS

| | | |
|---|---|---|
| RU | 2107950 C1 | 3/1998 |
| RU | 2161826 C2 | 1/2001 |
| RU | 2230375 C2 | 10/2004 |
| RU | 2009136387 | 9/2009 |
| WO | WO 00/77772 A2 | 12/2000 |
| WO | WO 2011/046474 A2 | 4/2011 |

OTHER PUBLICATIONS

Ramishvili, G. S., et al., Forensic Processing of Phonograms and Identification of a Speaker, 1991, p. 193, Tbilsi: Mezniereba.

* cited by examiner

SYSTEM AND METHOD FOR IDENTIFICATION OF A SPEAKER BY PHONOGRAMS OF SPONTANEOUS ORAL SPEECH AND BY USING FORMANT EQUALIZATION USING ONE VOWEL PHONEME TYPE

CROSS-REFERENCE TO RELATED APPLICATIONS

This application is a continuation of PCT Application No. PCT/RU2010/000661, filed on Nov. 3, 2010, which published in Russian as WO 2011/046474 on Apr. 21, 2011 and which claims priority benefit of Russian Patent Application No. 2009136387, filed on Sep. 24, 2009, the entire contents of which applications and publication are herein incorporated by reference in their entirety.

BACKGROUND

1. Field

The field relates to speaker recognition by voice, particularly to automatic, automated, and expert methods for identification of a speaker by phonograms of spontaneous oral speech, the methods intended for, including but not limited to, forensic processings.

Practical investigation, particularly forensic processing and comparison of phonograms of oral speech aimed at identification of a speaker are known in some cases to present obstacles to expert evaluation, such as short duration and low quality of the phonograms examined, different psycho-physiological states of the speakers in the phonograms compared, different contents and languages of the speech, as well as different types and levels of audio channel noise and distortion, etc., making it difficult to make a decision.

2. Description of the Related Technology

A method is known for identification of a speaker by phonograms, wherein the speaker's characteristics are extracted from certain uniform phrases spoken thereby (DE 2431458, IPC G 10 L 1/04, May 2, 1976).

This method comprises filtering speech signals through a comb of 24 bandpass filters, detecting the signals, smoothing the signals, and inputting the signals through an analog-digital converter and a switch into a digital processing device, wherein individualizing features associated with the integral speech spectrum are automatically recognized and stored.

Unfortunately, this method cannot be used by using phonograms of oral speech obtained in excessive distortion and noise environment because the method fails to provide sufficient number of individualizing features. Furthermore, this method has not proved to be sufficiently reliable for identification because it requires use of phonograms comprising identical verbal content for both a verified speaker and an unknown speaker.

A method is known for identification of an individual by using phonograms, wherein phonograms to be compared are subject to a voice input which is compared with a previously stored voice signature of that individual by singling out and comparing uniform keywords from the records under analysis (U.S. Pat. No. 3,466,394, IPC N04M1/24).

This method involves subjecting a speech signal to short-term spectral analysis, and then recognizing the contours of spectrum and main voice tone peculiarities dependence on the time period. The resulting contours are regarded as individualizing features. Identification of a speaker is based on a comparison of the phonograms contours obtained for the inspected and unknown speakers.

The weak point of this method is the recognition result dependence on the quality of phonograms made in excessive distortion and noise environment. Besides, this method has a high percentage of identification failures because it requires phonograms of the inspected and unknown speakers with the same words.

A method is known for identification of a speaker based on spectral-band-temporal analysis of spontaneous oral speech (G. S. Ramishvili, G. B. Chikoidze Forensic processing of phonograms and identification of a speaker. Tbilisi: "Mezniereba", 1991, p. 265).

To eliminate the dependence of the identification results on the speech semantics, sonorous speech elements are singled out of the verbal message, their energy values averaged over their lifetime in each of the 24 spectral filters in the field of higher formant sections. The basic tone recognition is based on singling out the fundamental component of the signal in the spectrum. The speech rate is recognized as well.

The parameters aforesaid are used as individualizing features.

This method fails for phonograms made in excessive distortion and noise environment of the speech record channel and different speakers' states due to the loss of the individualizing feature set validity.

A device and method are known for speaker recognition based on purely statistical models of known and unknown speakers' cepstral speech signal feature construction and comparison, for example (U.S. Pat. No. 6,411,930, IPC G10L15/08). Speaker recognition is performed by using Discriminative Gaussian mixture models.

This method, like most purely statistical approaches to speaker recognition, fails for very short (1 to 10 seconds) voice messages as well as the situations where the speakers' states and/or phonograms channels possess strongly different properties, or the speakers are in different emotional states.

A method is known for speaker recognition by using only stochastic characteristics (U.S. Pat. No. 5,995,927, IPC G10L9/00).

Speaker recognition is performed by constructing and comparing feature description covariance matrices of an input speech signal and reference speech signals of known speakers.

This method also fails to be used for short (5 seconds or less) voice messages, and is very sensitive to significant signal power reduction in particular areas of speech frequency range due to ambient noise as well as poor quality of microphones and channels for sound transmission and recording.

A method is known for recognition of isolated word, the method adaptable to a speaker (RU 2047912, IPC G10L7/06), which is based on input speech signal sampling, pre-emphasis, successive speech signal segmentation, segment coding with discrete elements, energy spectrum calculation, measuring formant frequencies and determining amplitudes and energy in different frequency bands of the speech signal, classification of articulatory events and states, defining and grading word standards, calculating intervals between word standards with the actualization of the word recognized, word recognition or failure, supplementing the standard dictionary in the course of adaptation to the speaker. Input speech signal is pre-emphasized in the time domain by differentiation from smoothing, energy spectrum quantization depends on the channel noise variance, formant frequency is determined by discovering the global maximum of the logarithmic spectrum and subtracting the given frequency-dependent function out of the spectrum aforesaid, classification of articulatory events and states determines the proportion of periodic and noise excitation sources as compared to the threshold value of square-wave pulse sequence autocorrelation coefficients in multiple frequency bands, the beginning and the end of articulatory movements and their corresponding acoustic processes are determined against the threshold value of the likelihood function from autocorrelation coefficients, formant frequencies and energies in given frequency bands, the speech signal is divided into intervals between the beginning and the end of acoustic processes, corresponding to specific articulatory movements, and sequentially, starting with vowels, and a segment is recognized only when its left and right boundary transition types match each other, while segmentation is finished when pauses between words in the left and right time segments have been recognized. Word standards are shaped as matrices with binary feature likelihood values, and recognition fails when the normalized interval difference from the unknown actualization to the next two standards that belong to different words is smaller than the set threshold value.

The disadvantage of this known method of isolated word recognition adapted to the speaker is its poor distinctiveness when recognizing speakers by spontaneous speech, since in most cases it does not distinguish between speakers of the same sex transferring a verbal message with the same contents.

A security system is known based on voice recognition (U.S. Pat. No. 5,265,191, IPC G10L005/00), which requires both the trainer and the unknown speaker to repeat at least one voice message. The system compares parametric representations of repeated voice messages made by the unknown and the known speaker and establishes the identity of the speakers compared only if every message pronounced by the unknown speaker is close enough to that made by the trainer, indicating failure if their representations strongly differ from each other.

The weak point of this system is its poor resistance to variable noises (vehicle and street noise, industrial premises) as well as the mandatory requirement for both speakers to pronounce one and the same voice message.

A method is known for automatic identification of a speaker by the peculiarities of the password phrase pronunciation (RU 2161826, IPC G10L17/00), which involves breaking the speech signal into voiced zones and defining time intervals within the zones aforesaid—at the speech signal intensity maxima, as well as at the beginning of the first and at the end of the last voiced zones. There are speech signal parameters set for the defined time intervals and compared to standards taking into account mathematical expectations and their acceptable repeatability error, with a view to which there are time intervals defined at the end of the first and at the beginning of the last voiced zones, as well as at the beginning and at the end of the others; the duration of time intervals is set as a multiple of the speech signal fundamental tone period, speech signal correlation coefficient values are determined and included with those compared with the standards, the formation of additional standards takes into account the speech signal parameter correlation coefficients. Identification of a speaker is based on the speech signal parameters and corresponding statistical characteristics.

The disadvantage of this known method is its poor noise resistance, since it requires determining the exact position of the fundamental voice tone period boundaries in the input speech signal, which is often hardly possible under acoustic and electromagnetic interference (office and street noise, speech channel settings, etc.), besides, speakers have to pronounce the same voice passwords and that cannot always be achieved in practice.

A speaker verifier based on the "nearest neighbor" distance measurement (U.S. Pat. No. 5,339,385, IPC G10L9/00) is known, including a display, a random hint generator, a speech recognition unit, a speaker verifier, a keyboard and a primary signal processor, with the primary signal processor inlet being the inlet of the verifier and its outlet connected to the first speech recognition unit and speaker verifier inlets, the first outlet of the hint generator being connected to the second inlet of the speech recognition unit, the outlet of which is connected to the display. The keyboard is connected to the third inlets of the speech recognition unit and the speaker verifier, the outlet of which is the outlet of the verifier. The speaker verifier used to establish the similarities or differences in voice passwords pronounced involves breaking the input speech signal into particular frames for analysis, calculating non-parametric speech vectors for each analysis frame and further proximity determination of thus obtained speech signal descriptions of the pronunciations compared on the basis of Euclidean distance to the nearest neighbor.

The disadvantage of this verifier is its poor noise resistance in office and street environment due to non-parametric speech vectors and Euclidean metrics in determining the degree of similarity/difference in a voice password pronunciations, as well as low recognition reliability (large share of false failures) due to the use of voice passwords with different word order caused by inevitable individual variability of pronouncing the same words in different contexts, even by the same speaker. Besides, it is hardly possible to secure pronunciation of the prompted verbal content by both speakers compared.

A method for speaker recognition (U.S. Pat. No. 6,389,392, IPC G10L17/00) is known, which involves comparing input speech signal obtained from the unknown speaker to speech standards of speakers known before, of which at least one is represented by two or more standards. Successive input signal segments are compared to standard successive segments to obtain a measure of proximity of the input and the standard speech signal segments compared. For each standard of a known speaker with at least two standards there are standard and input speech signal comparison composite results based on the input speech signal selection for each segment of the closest segment of the standard compared to the segment compared. Then the unknown speaker is recognized by the composite results of the input speech signal and standard comparison.

This known method of speaker recognition is limited in practical application, as the requirement for at least two standards for each verbal message is not always feasible in the actual environment. Besides, this method does not guarantee high reliability of speaker recognition in the environment of real acoustic office, street or vehicle noise, different emotional states of the speakers, as the segment by segment parametric speech signal description is subject to strong influence of additive acoustic noise and natural variability of speech. In addition, the low reliability of the method in excessive noise environment arises out of the fact that the closest standard segment compared within the proximity measure employed is to be found for each segment of the input speech signal, which entails a large number of pure noise segments corresponding to speech pauses both in the standard and the input speech signal.

A method for speaker recognition by phonograms of spontaneous oral speech (RU 2107950, IPC G10L5/06) is known. The method is based on using spectral-band-temporal analysis of speech signals, determining peculiarities of an individual's speech and comparing them with references, using the acoustic integral features as a parameter estimate of statistical distribution of the current range components and the main tone period and frequency distribution histograms, measured by phonograms with both spontaneous and fixed characteristics, measured on phonograms with both spontaneous and fixed contexts, taking the most informative ones for this speaker, not influenced by the noise and distortion present in the phonograms and use linguistic data (fixed or spontaneous ones), registered by an expert in the course of the phonograms auditory analysis involving the bank's support automated voice standards of oral speech dialects, accents, and defects.

This method loses its reliability for speakers with short phonograms, speaking different languages or being in substantially different psycho-physiological states because of employing an integral approach, averaging the speech signal and linguistic analysis characteristics.

A method is known for speaker recognition (RU 2230375, IPC G10L15/00, G10L17/00), which includes a segment by segment comparison of the input speech signal with samples of voice passwords pronounced by known speakers, and assessment of similarity between a first phonogram of the speaker, and a second, or a sample, phonogram by matching formant frequency in referential utterances of a speech signal, where the utterances for comparison are selected from the first record and the second record.

The known method identifies formant vectors of consecutive segments and statistical characteristics of the input speech signal power spectrum and speech signal standards, comparing them, respectively, to formant vectors of successive segments of each standard and with the standard speech signal power spectrum statistical characteristics, and forming a composite comparison metrics for the input and the standard signals. A weighted modulus of formant vector frequency difference is used as a measure of formant vector segment proximity. To calculate a composite input signal and standard comparison metrics, each input speech signal segment is given the closest standard segment within the corresponding measure of proximity with the same number of formants, and the composite metrics includes a weighted average measure of proximity between this input speech signal segment and the closest standard segment for all commonly used input speech signal segments, as well as a cross-correlation coefficient of the input speech signal power spectra and standard statistical characteristics. Speaker recognition is based on the outcome of the input speech signal and the standard composite metric comparison.

This method does not secure reliable speaker recognition when the phonic structure of the input speech signal differs strongly from that of the speech signal samples (e.g., short messages, different languages of the input signal and the standards), as well as in case of significant differences in the properties of record channels and differences in psycho-physiological state of the speakers in the phonograms compared. These shortcomings arise, to begin with, out of the use of the power spectrum statistical characteristics, which depend on the record channel properties, the state of the speaker and the phonic structure of the message, as a composite metric component, as well as the segmental proximity measure as a weighted average for all commonly used segments of the speech signal processed, which leads to averaging segment comparison errors and underestimating the influence of large inter-segment deviations, revealing the difference between the speakers even when there is a small average segment difference observed.

SUMMARY

Therefore, it is desirable to provide methods for identification of a speaker by phonograms of spontaneous oral speech, the methods intended for, including but not limited to, forensic processings and taking into account the above-mentioned matters, namely securing identification of a speaker by short speech phonograms recorded through various channels for audio recording, with high noise and distortion levels, in different psycho physiological states, with different verbal content, or in different languages.

One aspect is to provide a method for identification of a speaker by phonograms of spontaneous oral speech, wherein utterances of a speech signal are selected for comparison and individualizing features and methods of comparison thereof are used for recognizing the speaker, thus allowing reliable speaker identification for most practical cases, in particular, for both long and short phonograms to be compared, the phonograms recorded in different channels with a high level of noise and distortion, for records of spontaneous oral speech of speakers in different psycho-physiological states and/or of different languages, in order to broader apply the method, including its use for forensic proceeding purposes.

This is achieved by providing a method for identification of a speaker by phonograms of oral speech, comprising evaluating similarity between a first phonogram of the speaker and a second, or sample, phonogram by matching formant frequency in referential utterances of a speech signal, wherein the utterances for comparison are selected from the first phonogram and the second phonogram; selecting referential utterances of speech signals from the first phonogram and the second phonogram so as the referential utterances comprise formant paths of at least three formant frequencies, comparing therebetween the selected referential utterances of the first and the second phonograms comprising at least two identical formant frequencies, evaluating similarity of the compared referential utterances from matching other formant frequencies, wherein similarity of the phonograms is determined from evaluation of all the referential utterances compared.

This method can be based on the experimental assumption that low-frequency vocal tract resonances (formants) of an individual change their frequency mutually and correspondingly after the change of articulation. In particular, this can be true for the first 3-5 resonance frequencies, depending on the vocal tract length. If the frequency of at least one of the first four formants is changed, then, in most practical cases, one or more other low-frequency formants of the speaker are sure to change their frequency as well. This change can be caused by the acoustic relationship between vocal tract resonances and the anatomically restricted possibility to make any changes in the transverse area of the speaker's vocal tract. The theoretical grounds of this fact are seen in the research literature (G. Fant, Acoustic theory of speech production.—Moscow: Nauka, 1964; V. N. Sorokin, Theory of speech production.—M.: Radio and Communication, 1985).

Aspects of the method involve the use of the vocal tract acoustic resonance parameters, defined as the characteristic frequencies in the formant paths that determine the perceived quality of each speech sound, as the speaker's individualizing feature in the course of phonograms comparison.

These features can be noise resistant for phonograms recorded in excessive noise and signal distortion environment.

It has been found experimentally that the presence of three or more formant paths inside the spectrograms of a referential utterance in most cases can allow to unambiguously determine characteristic values of formant frequencies and, by comparing them, to reliably identify the speakers.

To secure additional noise resistance of the features defined in the additive broadband noise environment, formant frequency values for each referential utterance selected can be calculated as the average values at fixed time intervals in which the formant frequencies are relatively constant.

This involves using certain fixed formant frequency values within a specified time interval—formant vector—in each referential utterances of speech signal for comparison.

To ensure reliability of identification, it may be appropriate to compare referential utterances with the same frequency values of the first two formants and within the standard formant frequency variation for the selected type of sound from a fixed set of vowel-like sounds.

Phonograms comparison can involve comparing referential utterances with each other if they correspond to phonogram speech signal sections, which actualize comparable articulatory events, e.g., if the sounds pronounced have clear signal resonance structure with the frequency corresponding to two or more resonance frequencies (formants) regardless of the speech phonemes they correspond to. These areas are found in speech messages where speakers pronounce both identical and different phonemes.

Expert works call these utterances with comparable formant values as "formant-equalized" utterances.

To come to a general synthesizing identification solution, there can be at least two reference speech signal utterances related to the sounds articulated as differently as possible with maximum and minimum frequency values for the first and the second formants selected in the phonograms.

To ensure high reliability of the identification, referential utterances can be compared for several sounds articulated as differently as possible, e.g., most different embodiments of the vocal tract geometry.

Comparing formant-equalized speech utterances, which correspond to different, not necessarily identical sounds, can allow identification of the speaker in phonograms with substantially different phonic content, in particular, long and short phonograms, phonograms made by speakers in different psycho-physiological states, as well as the speakers of the same or different languages.

To ensure high reliability of speaker identification with the speech signal distorted badly due to substantially irregular frequency response of audio channels different for the phonograms compared, before calculating the formant frequency values, exposing the power spectrum of each phonogram signal to inverse filtering, calculating the time average for each power spectrum frequency component, at least for particular utterances of the phonogram, and then the original value of the phonogram signal power spectrum for each frequency spectrum component can be divided by its inverse (inverted) mean value.

Spectrum division with inverse filtering can be substituted by taking the logarithm of the spectra and subtracting the average spectrum power for each frequency component logarithm out of the original phonogram signal spectrum power logarithm of the phonogram.

Details are provided below by certain example embodiments with reference to the accompanying drawings.

DETAILED DESCRIPTION OF CERTAIN EMBODIMENTS

The method provides comparing at least two phonograms of spontaneous oral speech. Particularly, for forensic proceedings, one of the phonograms may be a phonogram of a speaker to be verified, whereas the other of the phonograms may be a phonogram of an unknown person (a sample record). The purpose of such proceedings is to establish identity or difference of the persons whose voices recorded by the phonograms are compared.

The phonograms compared are converted into digital form and their digital images are stored in PC memory as digital audio signal files.

The digital images are subjected to spectral analysis using a PC, in accordance with generally accepted signal spectral analysis procedures (S. L. Marple, Digital spectral analysis and its applications, Mir, 1990), and have their dynamic sonograms plotted and used to calculate formant paths as sequential time modification lines of vocal tract resonant frequencies, displayed in the sonograms as local spectrum maxima. Formant frequencies are corrected, if necessary, by being placed over a sonogram, with the apparent differences in the formant movement fixed.

Figure 9:
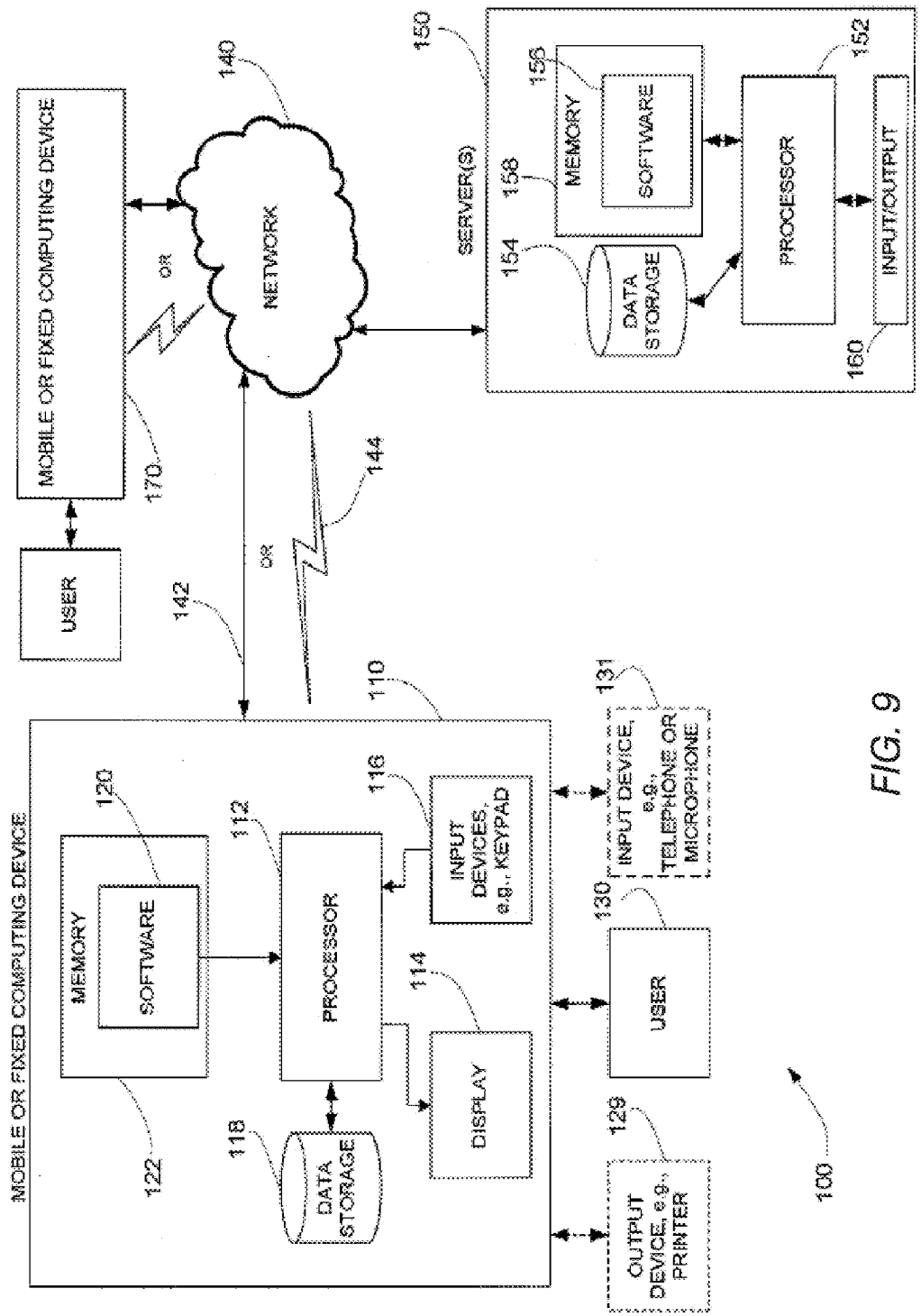
FIG. 9 is a diagram of an example of one embodiment of a configuration for operating a system and method for identification of a speaker by phonograms of spontaneous oral speech.

Certain embodiments of a system may utilize a network as described in conjunction with FIG. 9 and may be based on an example open system integrated architecture. In FIG. 9, the example open system integrated architecture may be based on, for example, a user interface interacting with a local or remote data repository and a local or remote application running on a local or remote application server, such as an application server 150. FIG. 9 is a block diagram of an example system 100 that may be used to implement certain systems and methods described herein. The functionality provided for in the components and modules of computing system 100 may be combined into fewer components and modules or further separated into additional components and modules. Various other types of electronic devices communicating in a networked environment may also be used.

Referring to FIG. 9, an example configuration of components of an embodiment of the system 100 will now be described. A mobile or fixed computing device 110 may be operated by a user 130. There may be other mobile or fixed computing devices such as a device 170 operated by other users. The computing device 110 can be a handheld computing device or other portable computing device such as a Palm, Pocket personal computer (PC), Linux based handheld, PDA, smartphone such as an iPhone®, Tablet computer such as an iPad®, or PC having a display. In other embodiments, the computing device can be any form of Internet connected device, including but not limited to PCs, mobile devices, PDA, laptops, tablets, chips, keyboards, voice audio and video software, mouse, keypads, touch pads, track ball, microphones, videos, storage devices, network devices, databases, scanners, copiers, digital pens, image recognition software and device, screens and other forms of displays, netbooks and other forms of computer hardware. The computing device 110 in certain embodiments operates in a stand-alone (independent) manner. In other embodiments, the computing device 110 may be in communication with one or more servers 150 via a network 140, such as a wide area network, the Internet, or a cloud. The server(s) include one or processors 152, memory 158, data storage 154 and system software 156 executed by the processor(s), and input or output devices 160. In certain embodiments, the data storage 154 stores one or more databases used by the system. The processor(s) 152 may be in communication with the database(s) via a database interface, such as structured query language (SQL) or open database connectivity (ODBC). In certain embodiments, the data storage 154 is not included in server(s) 150, but is in data communication with the server(s) via the database interface. The connection from the computing device 110 to the network 140 can be a wireless or a satellite connection 144 or a wired or direct connection 142. In certain embodiments, the server(s) are part of a web site, such as on an intranet or the Internet. In one embodiment, the computing device may run software for the system and method described herein only when connected to the server(s) 150.

The computing device 110 can include a processor 112, memory 122, a display 114, and one or more input devices 116. The processor 112 may be in data communication with a data storage 118. In certain embodiments, the data storage 118 may store prior records of the user and/or other data or software. System software 120 is executed by the processor 112. The system software 120 may include an application graphical user interface (GUI). The application GUI can include a database interface to the data storage 118 of the computing device. In certain embodiments, the software is loaded from the data storage 118. In embodiments where the computing device 110 communicates with a web site, the processor utilizes browser software in place of or in addition to the software 120. The network browser may be, for example, Microsoft Internet Explorer®, Apple Safari®, Mozilla Firefox®, Google Chrome™, browsers from Opera Software™, and so forth. An optional output device 129, such as a printer may be connected to the computing device 110. An optional input device 131, such as a telephone or a microphone may be connected to the computing device 110.

Referential utterances, to compare formant frequencies in, are selected from the first and second sonograms of the phonograms compared.

Formant frequencies themselves are influenced by many random factors at the moment of pronouncing certain sounds, which accounts for their "disappearing" from some segments, and "trembling" from segment to segment. Besides, as vocal tract geometry is constantly changing in the course of speech delivery, the formant frequencies keep moving smoothly from one value to another, forming formant paths. At the same time, comparing formant frequencies requires selecting certain fixed values for each referential utterances of a speech signal.

To ensure this condition is met, formant frequencies to compare referential utterances and phonograms by are selected in our identification method as follows.

Initially, there are referential utterances meeting the following two criteria selected from the sonograms of the first and the second phonograms:

(1)—the referential utterance containing formant paths of three or more formants (2)—the values of the first two formants of the formant paths aforesaid being within the standard formant frequency variation for one of the selected type of sound from a fixed set of vowel-like sounds.

It has been found experimentally that the telephone channel frequency range requires, as a rule, four formant paths of the selected referential utterance for male speakers and three for female.

Then there are formant vectors determined in each referential utterance selected for subsequent comparison of formant frequencies; the values of formant frequencies are calculated as average for fixed time intervals in which the formant frequencies are relatively stable.

The use of formant vectors to compare formant frequencies within each referential utterance allows selecting areas where interpolated formant frequencies smoothed in time and regularity form relatively stable values fit for reliable registration and subsequent comparison from the sets of "trembling" frequencies and sometimes "disappearing" formant values, thus securing additional noise resistance of individualizing features in the additive broadband noise environment.

It has been found experimentally that the presence of three or more formant paths inside the sonograms of the referential utterance in most cases allows to unambiguously determine values of formant frequencies for at least one formant vector located in the referential utterance; and by subsequently comparing them to reliably identify the speakers.

A duration of the referential utterance is determined by the speech signal segment boundaries, where the formant paths are clearly determined for those formants, which are then used to position the formant vectors. Lengthy and significantly heterogeneous in their phonic structure speech signal segments, prospectively used as referential utterances, are divided into several referential utterances, each of which first two formants, as a rule, do not exceed the typical limits of formant frequency variation for one vowel phoneme type in the corresponding language.

Figure 1:
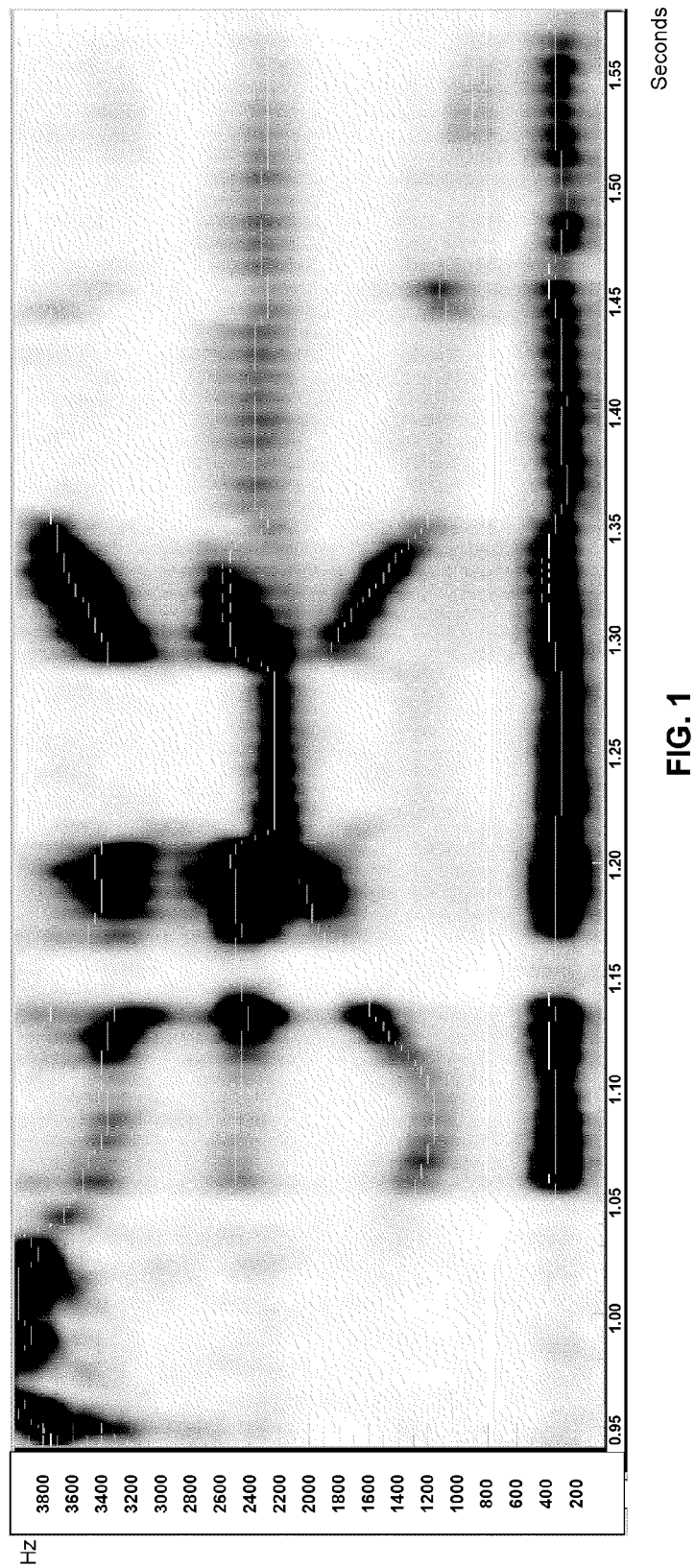
FIG. 1 is a diagram of a sample sonogram with the [te] syllable formant paths overlaid.

A sample sonogram with overlaid formant paths is shown in FIG. 1.

The sonogram shown in FIG. 1 is the syllable [te] sonogram pronounced by a male speaker. The horizontal axis represents time in seconds. The vertical axis represents frequency in Hz. The sonogram blackening intensity represents the signal power at the corresponding point of time and frequency. The thin black lines represent the automatically selected formant frequencies laying formant paths.

The vertical lines mark the boundaries of the referential utterance and the formant vector selected for comparison. A formant vector is a narrow interval within a referential utterance in which the formant frequency value is relatively stable.

Horizontal cursors mark the position of formant frequencies. The sonogram in FIG. 1 shows them as approximately equal: 430, 1,345, 2,505, and 3,485 Hz.

Having selected referential utterances for the first and second phonograms signals compared and defined the formant vectors within the utterances aforesaid, each referential utterance and formant vector of the first phonogram signal is compared to a referential utterance and a formant vector from the second phonogram signal, so that the vectors compared had the same formant frequency values for at least two formants. If this is impossible, the referential utterances are considered non-comparable and not compared to each other in the future.

Such choice of referential utterances and formant vectors compared corresponds to the selection and comparison of speech signal segments in the first and second phonograms, where comparable articulatory events are actualized, e.g., the speakers pronounce sounds with clearly defined resonance structure of the signal spectrum and the frequencies of two or more resonances (formants) are the same regardless of the phoneme pronounced by the speakers.

As it was mentioned earlier, such utterances with comparable formant frequency values are regarded by expert literature as "formant-equalized" utterances. These formant-equalized utterances are found in speech segments where speakers pronounce both identical and different phonemes. For example, there can be a static vowel pronunciation utterance selected as a referential utterance for comparison in the first phonogram and a fast transition from one phoneme to another with a section where at least two formant frequency values match the corresponding formant frequency values of static vowels in the first phonogram—in the second phonogram.

Formant frequency match or failure to match often follows the known threshold method. The deviation threshold values themselves depend on the quality of the signal in a particular phonogram (from the signal/noise ratio, the type and intensity of noise and distortion, physical and psycho-physiological state of the speaker), and are determined on the basis of the natural formant frequency variability for each speaker in this phonogram, for this type of sounds, and for each formant separately. This variability and the corresponding thresholds are determined, for example, by searching and comparing referential utterances and formant vectors inside the phonogram, that is, the speech signal for each of the phonograms.

The formant frequencies of other non-equalized formants are compared in the equalized utterances. Matching or failure to match the values of these frequencies determines the match/failure to match between the referential utterances compared (certain utterances). For example, in typical practical cases a 3% deviation is considered acceptable and 10%—unacceptable.

If the vector formant frequencies are the same, then the speakers are considered identical for this type of sound. This situation demonstrates that the speakers compared have identical vocal tract geometry characterized by acoustic resonances when pronouncing this type of sound in the comparable time periods.

Decision about match or mismatch of formant-equalized utterances of the phonograms is taken for each selected referential utterance of the first phonogram. Making a sound decision for each type of sound requires comparing several (usually 3-5) referential utterances with formant frequencies corresponding to this type of sound.

The referential utterance of the first phonogram in the second phonogram revealing a formant-equalized referential utterance that fails to match the formant frequencies of the first phonogram referential utterance formant vectors requires performing a reverse search for a formant-equalized utterance with the same formant frequencies in the first phonogram. Only a failure to find matching vector can serve as the basis for taking the decision of formant vector mismatch in the two phonograms for this type of sound and, therefore, the difference of speakers for this type of utterance. This situation demonstrates that the speakers compared have different vocal tract geometry for comparable articulations characterized by acoustic resonances when pronouncing this type of sound in the comparable time periods.

Speaker identification requiring the selection of formant-equalized utterances which correspond to different, not necessarily identical sounds, allows recognizing the speaker in cases with strongly different phonic content of the phonograms. The approach aforesaid secures, above all the rest, speaker identification by short phonograms, phonograms made by speakers in different psycho-physiological states, as well as the speakers of the same or different languages.

The author has experimentally shown that ensuring high reliability of male speaker identification in most practical cases requires equalizing (selecting equal) frequencies of three formants and comparing the value of the fourth one. Women's and children's voices also require equalizing three formants, but this is not possible in many practical cases therefore it is allowed to equalize (select equal) two formant frequencies and compare the value of the third one.

Coming to a general synthesizing identification solution may require searching and comparing comparable formant-equalized utterances in the phonograms to make up a representational selection of critically different articulation types, e.g., for maximum difference between the vocal tract geometries of the speakers compared. Theoretical studies demonstrate that these types of articulation (L. V. Bondarko, L. A. Verbitskaya, M. V. Gordina, Basics of General Phonetics.—St. Petersburg: SPSU, 2004, G. Fant Acoustic theory of speech production.—Moscow: Nauka, 1964; V. N. Sorokin. Theory of speech production.—M.: Radio and communication. 1985) correspond to vowels at the top of the so-called "phonetic triangle", e.g., vowel sounds with maximum and minimum first and second formant frequency values for the whole range of the first two formant frequency changes.

For example, the representational set for the Russian language typically includes referential utterances of sounds with formant frequencies close to the average values for the vowels of [Λ], [o], [v], [e], [i] type. For the English language—the vowels of A, O, U, E, I type.

For example, in most languages of different types, the formant frequencies of the sounds in a representative set of referential utterances for male speakers should be set to formant frequencies in the following typical areas with the deviation of about +/−20%

| | Type of the sound | | | | | | | |
|---|---|---|---|---|---|---|---|---|
| | 1 (U) | 2 (O) | 3 (A) | 4 (E) | 5 (I) | 6 (ɛ) | 7 (Ӱ) | 8 ((Ɔ)) |
| First formant F1, Hz | 300 | 430 | 700 | 420 | 300 | 500 | 350 | 500 |
| Second formant F2, Hz | 700 | 1000 | 1300 | 1800 | 2100 | 1650 | 1350 | 1500 |

The formant frequencies of the referential utterances selected should be similar for all types of sounds in the table. In this case there should be several referential utterances for each type of sound. It has been found experimentally that to secure reliable identification decision for each type of sound it is enough to find 3-4 referential utterances in each of the phonograms compared. In general, taking a final synthesizing identification decision requires 4-8 different types of sounds. Thus, phonograms compared require 12-32 referential utterances, depending on the speech signal quality.

Short phonograms require a minimum necessary set of sounds containing referential utterances with formant frequencies close to at least three different types of sounds in the table.

Referential utterances for each type of sound (usually at least 3) require the formant equalization and value comparison procedure described above with a separate identification decision taken stating the formant match/mismatch for each type of sound. A formant frequency decision for a given type of sound the referential utterances compared belong to involves an aggregate formant-equalized referential utterance decision for each type of sound. The decision is positive if all formant-equalized utterances of this type demonstrate a formant frequency match for all formants considered. The decision can be probabilistic if the quality of the phonogram is poor and does not allow stating the formant position accurately enough. The decision is uncertain if the quality and quantity of the speech phonogram material is insufficient to secure utterance and formant vector recognition.

Particular identification decisions for different types of sounds are combined into general synthesizing identification decision on the identity or difference of the speakers whose speech messages are recorded in the phonograms compared.

A definitely positive synthesizing decision is usually based on positive particular identification decisions for at least five different sounds with at least 15 referential utterances compared altogether and without negative particular identification decisions excluding the speakers' identity. A negative identification decision is made if there is at least one definitely negative particular identification decision for one type of sound. The decision can be probabilistic if the quality of the phonogram is poor and allows neither singling out a sufficient number of referential utterances, nor determining accurately enough positions of the formants.

Implementation of the method is proved by the following examples comparing sonograms with overlaid formant paths for matching and mismatching speakers.

Figure 2:
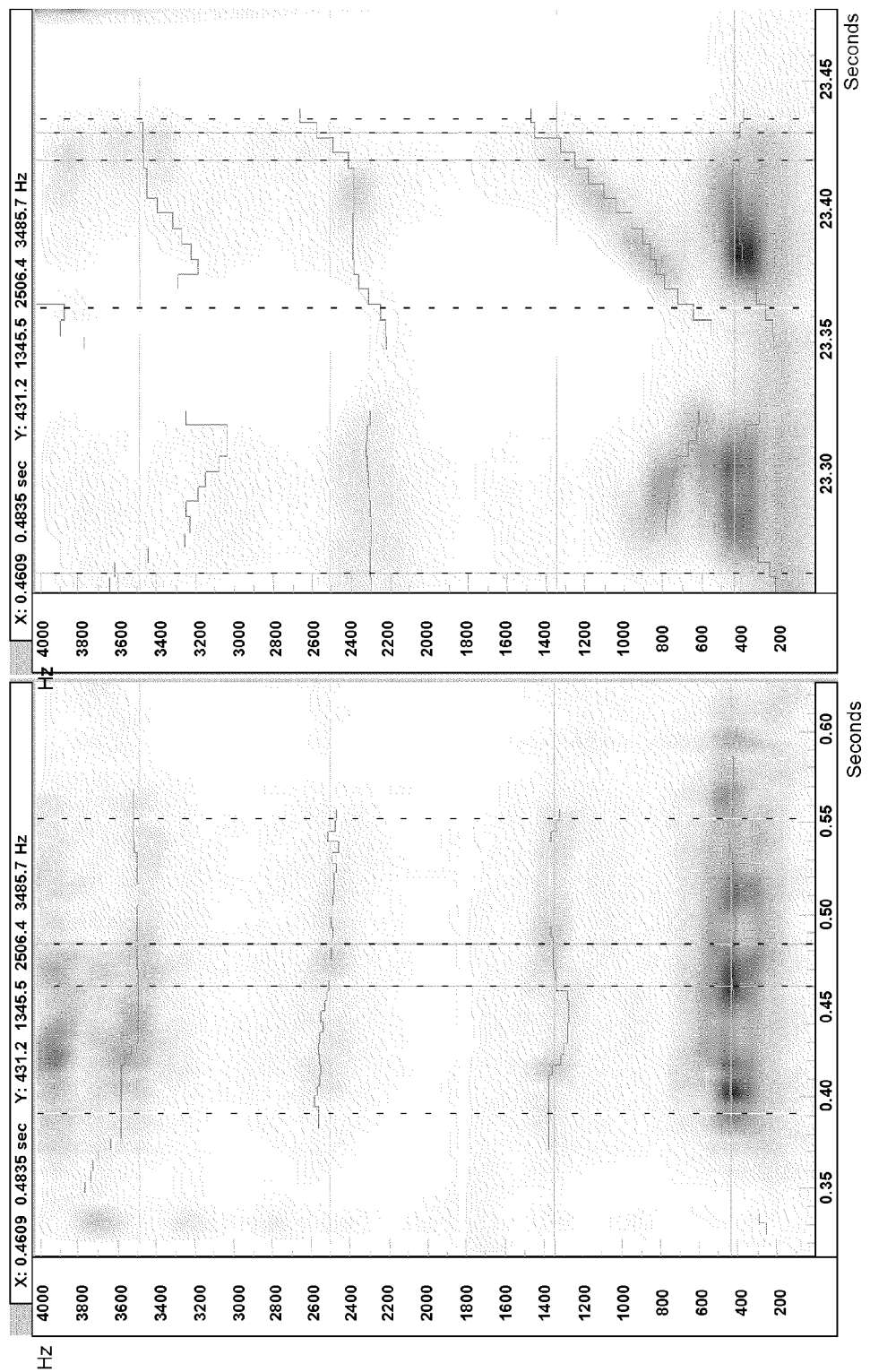
FIG. 2-3 are diagrams of sample comparisons for sonograms with formant paths overlaid for the [e]-type sounds matching speakers.
Figure 3:
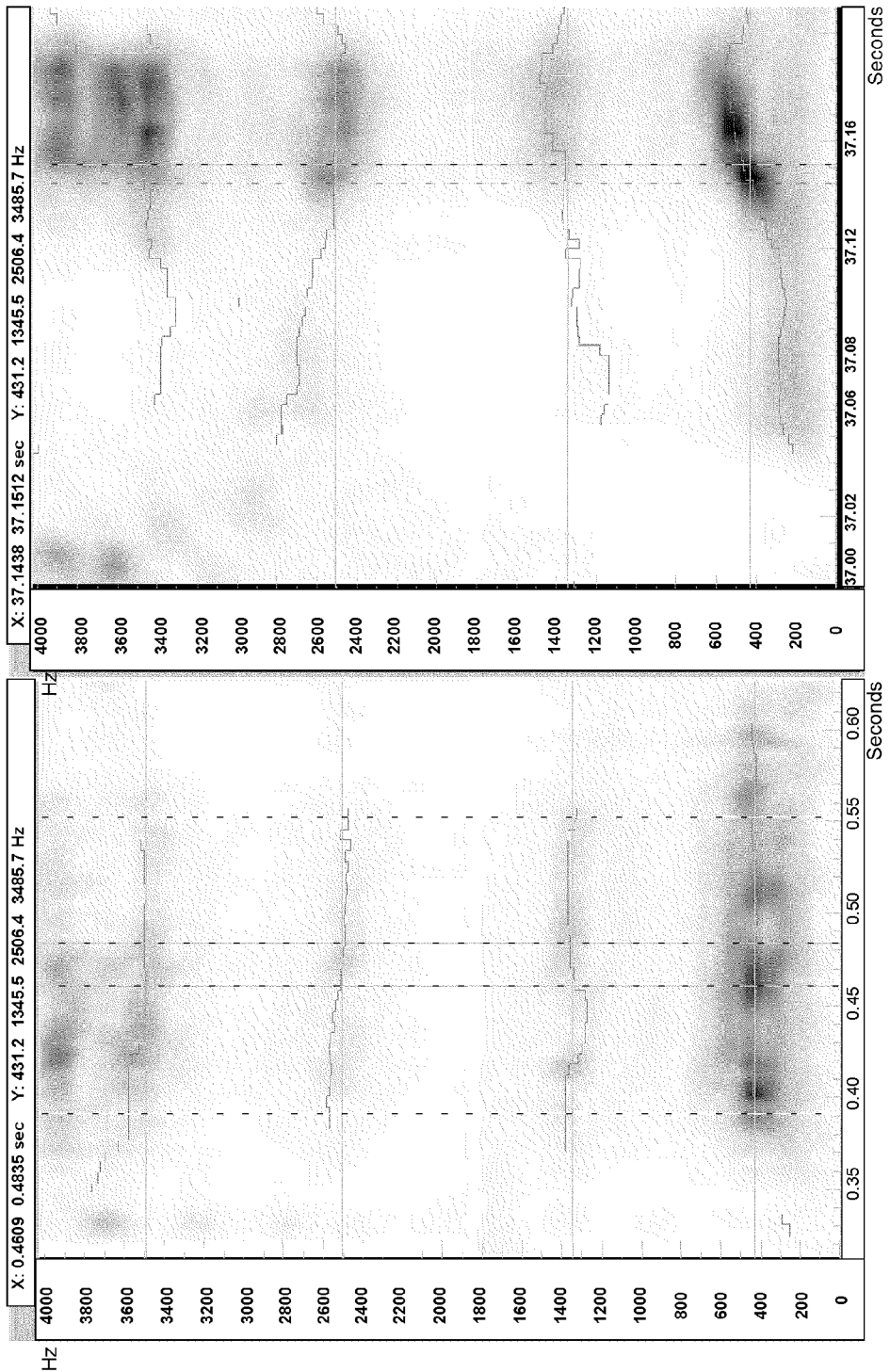
Figure 4:
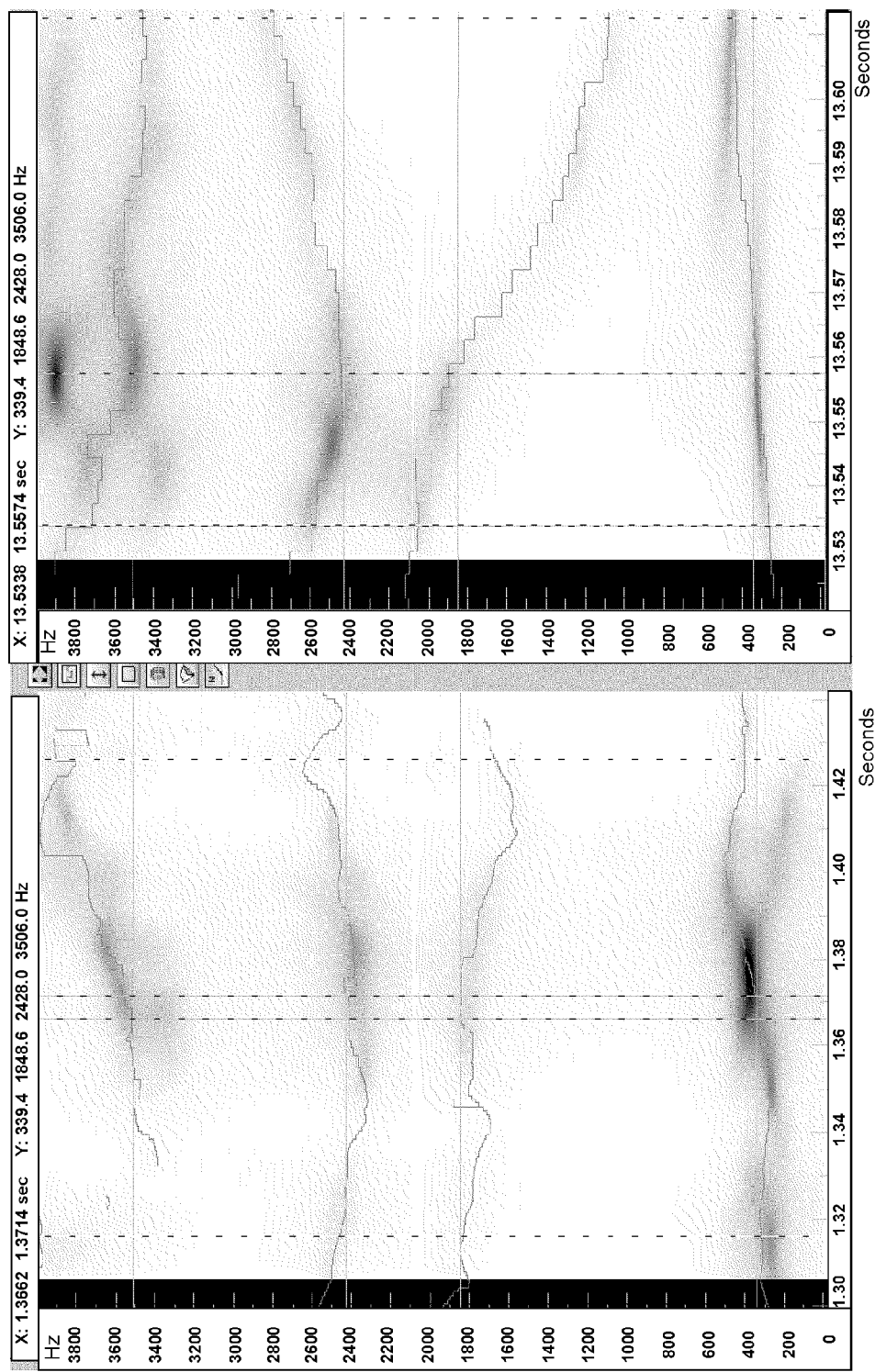
FIG. 4 is a diagram of a sample comparison for sonograms with formant paths overlaid for the [e]-type sounds matching speakers.
Figure 5:
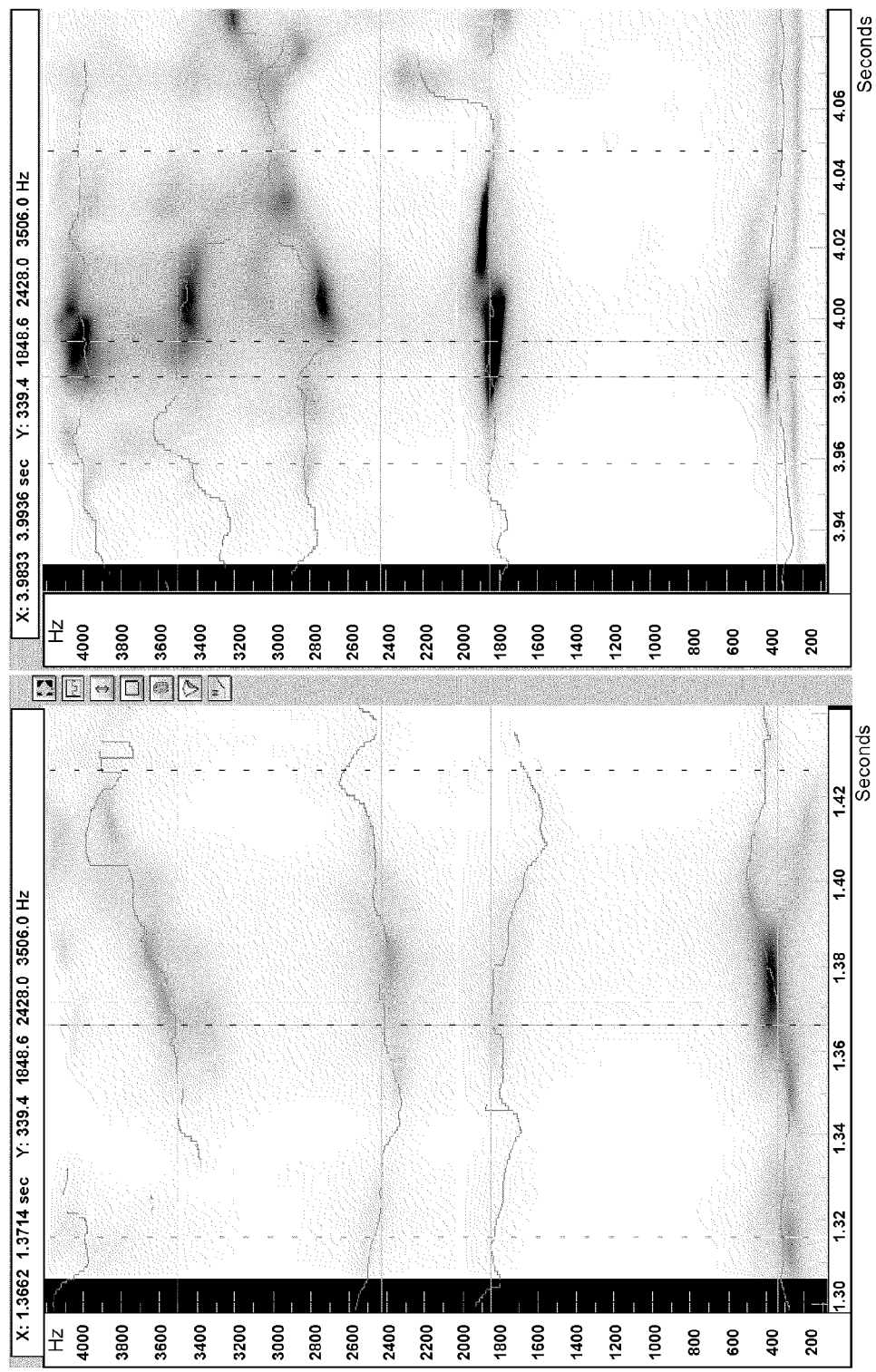
FIG. 5 is a diagram of a sample comparison for sonograms with formant paths overlaid for the [e]-type sounds mismatching speakers.

FIGS. 2-4 show sample comparisons for sonograms with formant paths overlaid for the [e]-type sounds matching frequencies (FIGS. 2,3), for the [e]-type sounds (FIG. 4) and mismatching vectors for the [e]-type sounds (FIG. 5).

FIG. 2 illustrates sonograms with formant paths overlaid for the [e]-type sounds of the [te] syllable (in the left part of the figure) and the word ['mogut] /they can/ (in the right part of the figure) pronounced by the same male speaker. The horizontal axis represents time in seconds. The vertical axis represents frequency in Hz. The sonogram blackening intensity represents the signal power at the corresponding point of time and frequency. The thin black lines represent the automatically selected formant frequencies laying formant paths. The vertical lines mark the boundaries of the referential utterances selected for comparison and the formant vectors in them. The horizontal cursors mark the matching position of formant frequencies. They approximately equal: 430, 1,345, 2,505, and 3,485 Hz. Different phonemes have identical frequencies in the formant vectors marked (mid-tonic [e] and the very end of the post-tonic [U]).

FIG. 3 illustrates sonograms with formant paths overlaid for the [e]-type sounds of the [te] syllable (in the left part of the figure) for matching speakers and the central section of the [suda] syllable of the [gosu'darstvo] /state/(in the right part of the figure) pronounced by the same male speaker. The horizontal axis represents time in seconds. The vertical axis represents frequency in Hz. The sonogram blackening intensity represents the signal power at the corresponding point of time and frequency. The thin black lines represent the automatically selected formant frequencies laying formant paths. The vertical lines mark the boundaries of the referent utterances selected for comparison and the formant vectors in them. The horizontal cursors mark the matching position of formant frequencies. They approximately equal: 430, 1,345, 2,505, and 3,485 Hz. Different phonemes have identical frequencies in the formant vectors marked (mid-tonic [e] and the beginning of the pre-tonic [U]).

FIG. 4 illustrates sonograms with formant paths overlaid to be pronounced by matching speakers for the [e]-type sounds of the [re] syllable of the [inte'resny] /interesting/ word (in the left part of the figure) and the [she] syllable of the [re'shenije] /decision/ word (in the right part of the figure) pronounced by the same male speaker. The horizontal axis represents time in seconds. The vertical axis represents frequency in Hz. The sonogram blackening intensity represents the signal power at the corresponding point of time and frequency.

The thin black lines represent the automatically selected formant frequencies laying formant paths. The vertical lines mark the boundaries of the referential utterances selected for comparison and the formant vectors in them. Horizontal cursors mark the matching position of formant frequencies for tonic [e] phoneme formant vectors. They approximately equal: 340, 1,850, 2,430, and 3,505 Hz.

FIG. 5 illustrates sonograms with formant paths overlaid to be pronounced by non-matching speakers for the [e]-type sounds of the [re] syllable of the [inte'resny] /interesting/ word (in the left part of the figure) and the [de] syllable of the [utverzh'denie] /statement/ word (in the right part of the figure) pronounced by the different male speakers. The horizontal axis represents time in seconds. The vertical axis represents frequency in Hz. The sonogram blackening intensity represents the signal power at the corresponding point of time and frequency. The thin black lines represent the automatically selected formant frequencies laying formant paths. The vertical lines mark the boundaries of the referential utterances selected for comparison and the formant vectors in them. The horizontal cursors mark the matching position of three formant frequency values. They approximately equal: 340, 1,850, and 3,505 Hz. Instead of the left sonogram speaker's third 2,430 Hz formant, the right sonogram speaker has the third formant in the region of 2,800 Hz.

To ensure high reliability of speaker identification with the speech signal distorted badly due to substantially irregular frequency response of audio channels different for the phonograms compared, there is a speaker identification option proposed involving inverse filtering of the phonogram signals compared prior to completing the above stages.

Before calculating the sonograms and formant frequency values, the power spectrum of each phonogram signal is exposed to inverse filtering, calculating the time average spectrum for the sonogram as a whole or its particular components, and then dividing the original value of the phonogram signal spectrum power for each frequency by its inverse average value. The inverse power value is the spectrum power value obtained when we divide one by this value.

The inverse filtering procedure can be performed not by division but by taking the logarithm and subtracting the corresponding spectra. In this case, before calculating the sonograms and formant frequencies the signal spectrum of each phonogram is transferred into a spectrum logarithm, the time average spectrum logarithm is calculated for the phonogram as a whole or its individual utterances, and then the average spectrum power logarithm for each frequency is subtracted from the original signal spectrum power logarithm value of the phonogram processed.

Figure 6:
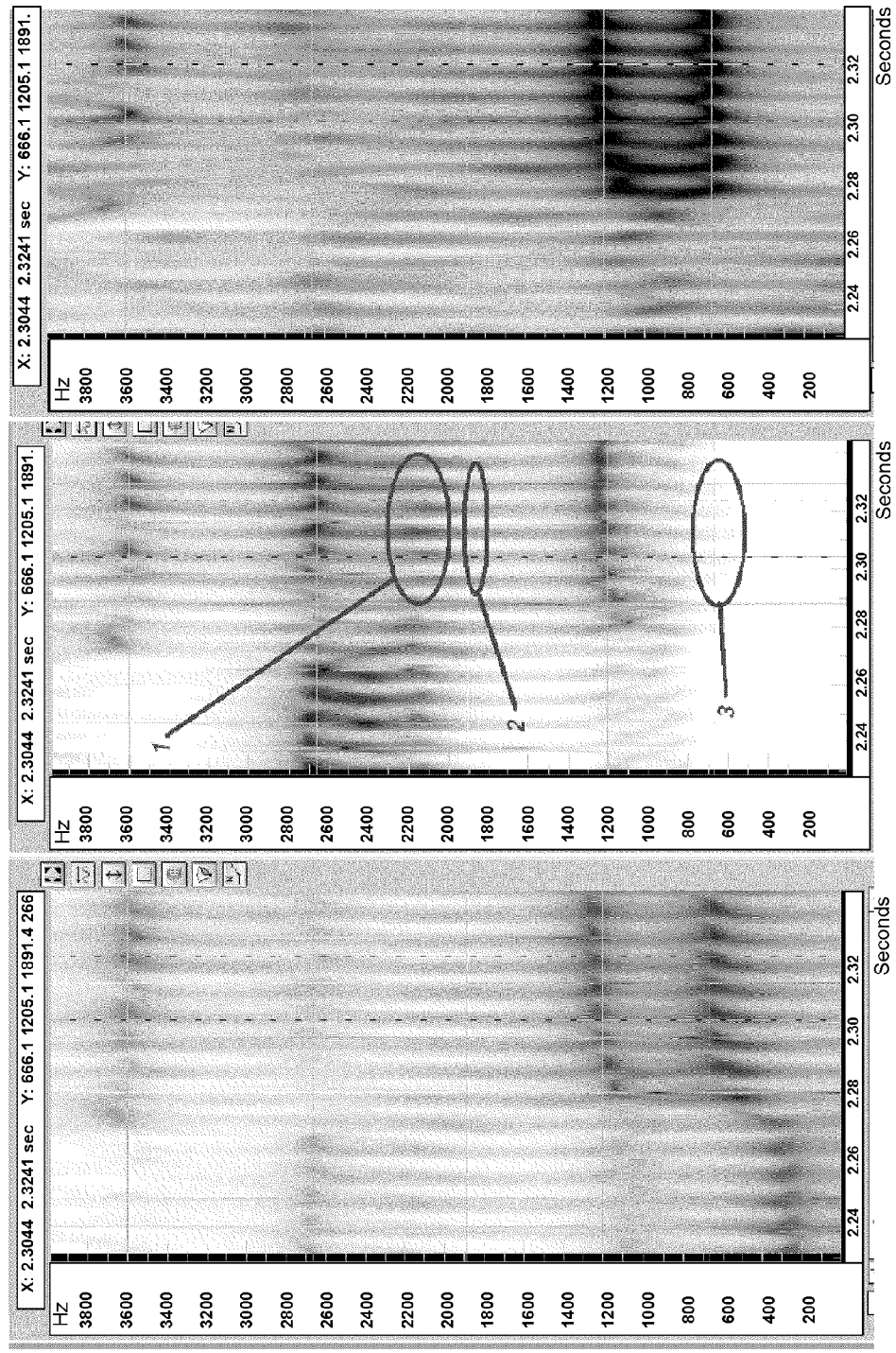
FIG. 6 is a diagram of a sample comparison for three sonograms of one and the same speaker's signal (referential utterance with the [na] syllable) before and after inverse filtration.
Figure 7:
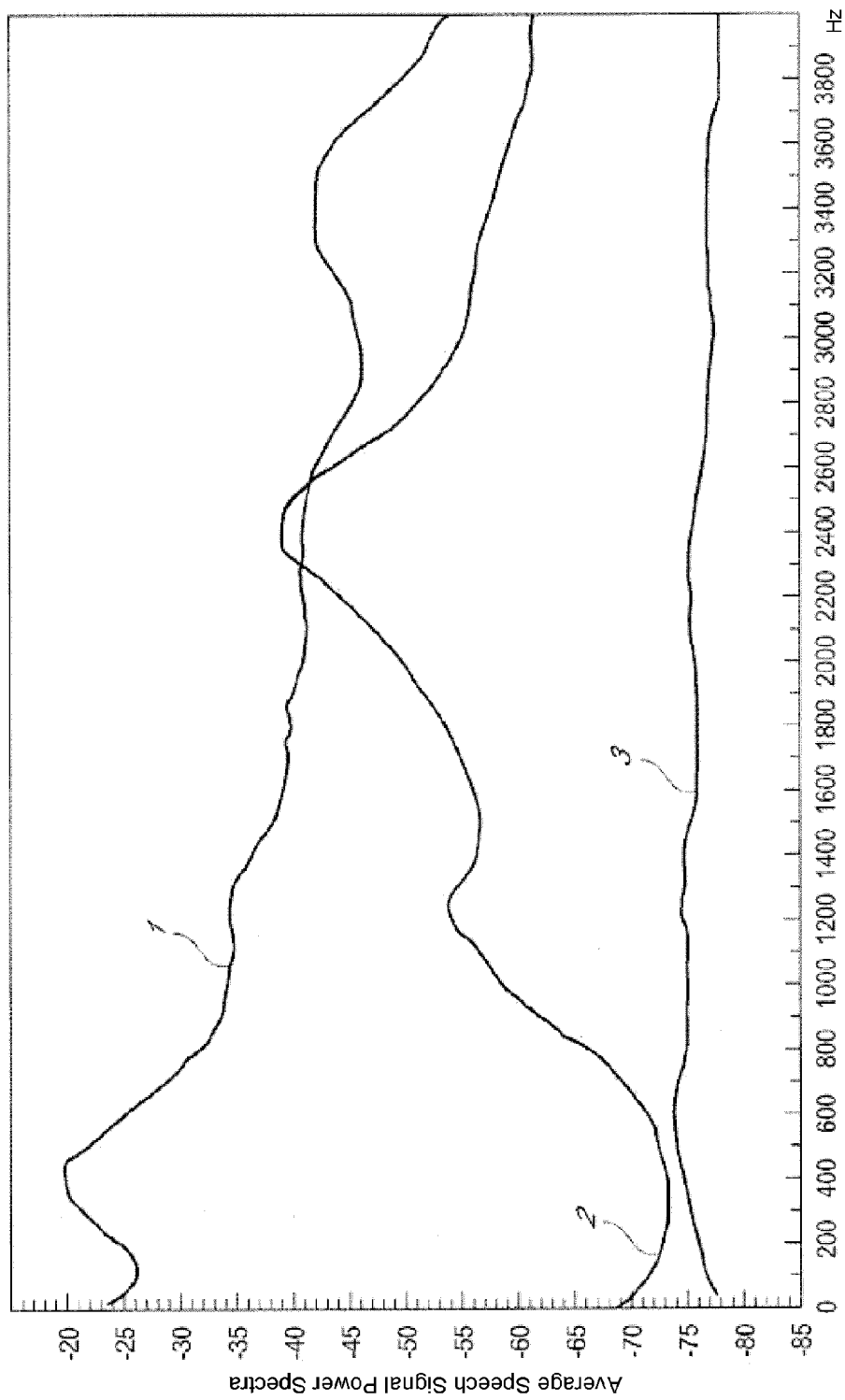
FIG. 7 is a diagram of a sample comparison of average speech signal power spectra for the three phonograms in FIG. 6.
Figure 8:
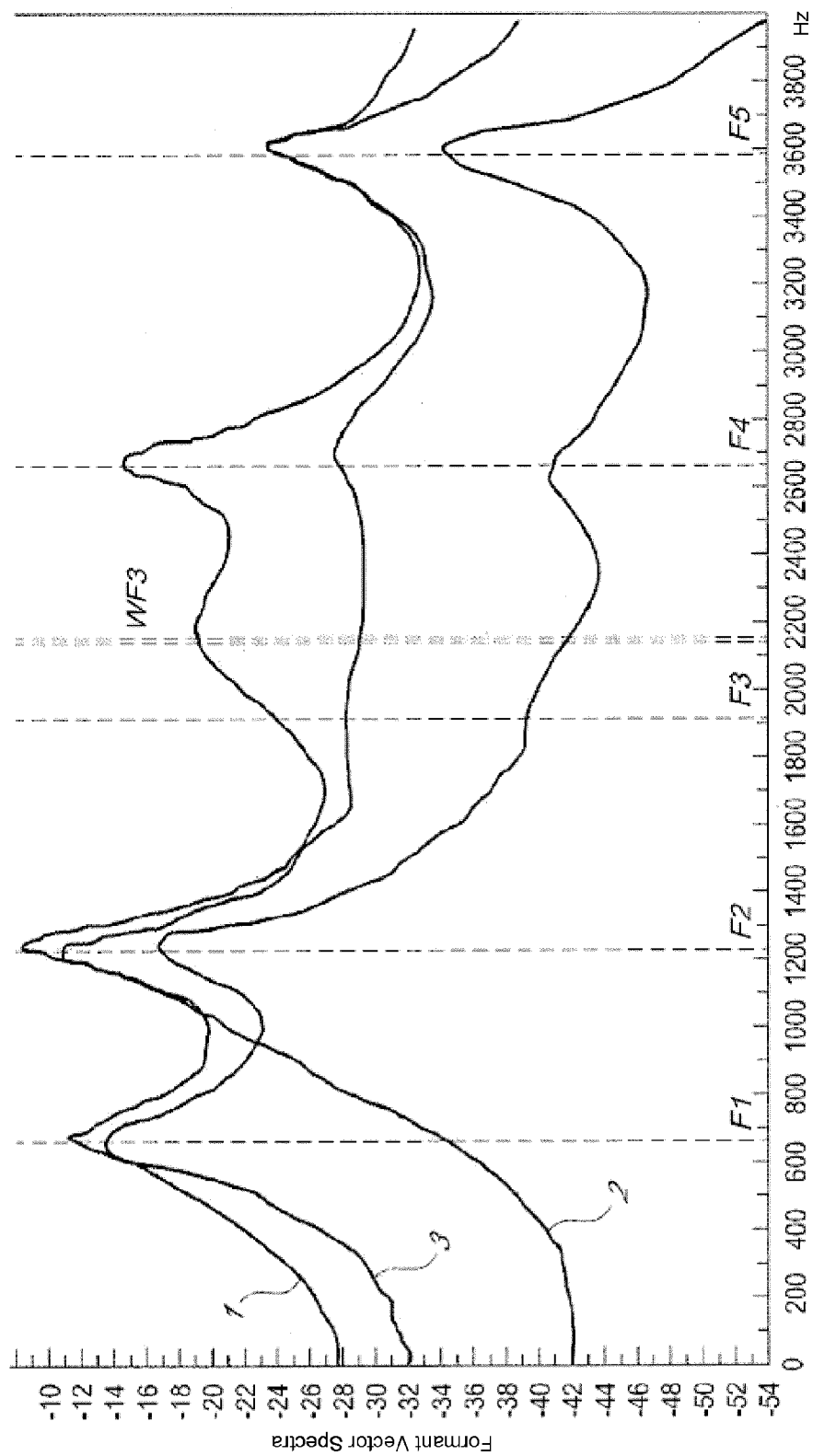
FIG. 8 is a diagram of a sample comparison for formant vector spectra, defined in the sonograms shown in FIG. 6.

FIGS. 6-8 illustrate the use of inverse filtering to determine the values of formant frequencies for the formant vector selected.

FIG. 6 shows three sonograms of one and the same speech signal (referential utterance with the [na] syllable):
the left box sonogram refers to the original speech signal, recorded through a highly sensitive microphone
the central box sonogram refers to the same speech signal, recorded through a low-quality phone path
the right box sonogram refers to the same speech signal, recorded through a low-quality phone path having been subjected to inverse filtering according to the proposed method implementation options.

In each sonogram in FIG. 6 the horizontal axis represents time in seconds from the phonogram start, the vertical axis—frequency in Hz. The sonogram blackening intensity is proportionate to the signal spectrum power at the corresponding point of time and frequency. The horizontal cursors mark the five low-frequency resonance frequency values of the speaker's vocal tract for the formant vector, marked by the vertical cursors, in the original phonogram.

The central phonogram central ovals with reference numerals 2 and 3 mark the spectrum areas where there is no trace of the F1 and F3 formants, present in the original phonogram.

The oval marked 1 shows a false formant frequency, which appears only on sonogram 2 due to the influence of low-quality telephone channel.

FIG. 7 shows: curve (1)—average original speech signal power spectrum for the whole phonogram, the sonogram of which is shown in the left box of FIG. 6; curve (2)—average original speech signal power spectrum for the whole phonogram, the sonogram of which is shown in the central box of FIG. 6; curve (3)—average original speech signal power spectrum for the whole phonogram, the sonogram of which is shown in the right box of FIG. 6;

FIG. 8 shows the averaged spectra and marked formant frequencies for the formant vector, highlighted in the sonograms in FIG. 6. Curve (1) represents the middle formant vector spectrum for the original sonogram, shown in the left box in FIG. 6, curve (2)—the same phonogram, passed through a low-quality phone path (corresponds to the central box in FIG. 6), curve (3)—for the phonogram, passed through a low-quality phone path and subjected to inverse filtering (right box in FIG. 6). The vertical cursors mark F1, F2, F3, F4, and F5 formants, matching for the original phonogram (left box in FIG. 6) and the phonogram after inverse filtering (right box in FIG. 6). Formants F1 and F2 are not shown in curve 2. Curve 2 clearly shows an additional false WF3 formant, which this formant vector does not have in the original phonogram.

Thus, the speech signal spectrum, recorded through a low-quality phone path, where there is no trace of F1 and F3 formants (ovals marked with numbers 2 and 3 of the central box sonogram in FIG. 6), FIG. 8 shows these F1 and F3 formants as present in the original phonogram (curve 1) and the phonogram after inverse filtering (curve 3). They are not shown on the phonogram of the low-quality telephone path (curve 2 in FIG. 8). At the same time, phonogram 2 shows a false WF3 formant.

These examples show that the proposed inverse filtering allows restoring the original phonogram formant structure, broken when phonograms pass through low-quality channels.

This experiment allowed the authors to find out that inverse filtering performed both by division, and by taking logarithms and subtracting the corresponding spectra gives practically the same results.

The method can be implemented using existing equipment such as shown in FIG. 9.

Figure 10:
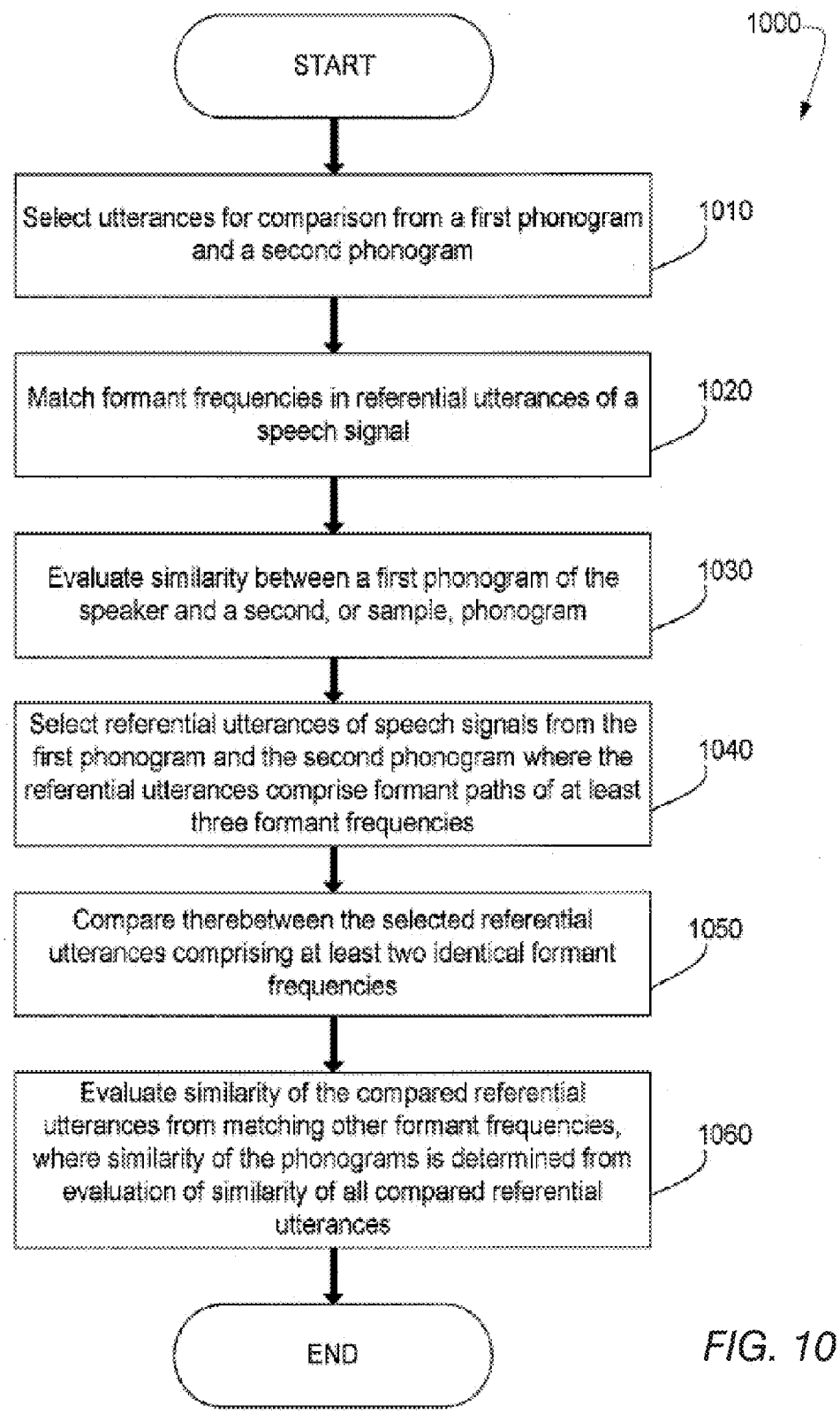
FIG. 10 is a flowchart of one embodiment of a method for identification of a speaker by phonograms of spontaneous oral speech.

Referring to FIG. 10, a method 1000 of identifying a speaker by phonograms of oral speech will be described. The method can be performed using one of the computing devices and a memory or database as shown in FIG. 9, for example, or other hardware and/or software. After starting, the method at a step 1010 selects utterances for comparison from a first phonogram and a second phonogram. Proceeding to a step 1020, the method matches formant frequencies in referential utterances of a speech signal. Moving to a step 1030, the method evaluates similarity between a first phonogram of the speaker and a second, or sample, phonogram. Continuing at a step 1040, the method selects referential utterances of speech signals from the first phonogram and the second phonogram, where the referential utterances comprise formant paths of at least three formant frequencies in certain embodiments. Proceeding to a step 1050, the method compares therebetween the selected referential utterances comprising at least two identical formant frequencies in certain embodiments. Moving to a step 1060, the method evaluates similarity of the compared referential utterances from matching other formant frequencies, where similarity of the phonograms can be determined from evaluation of similarity of all compared referential utterances. The method then completes at the end step.

Figure 11:
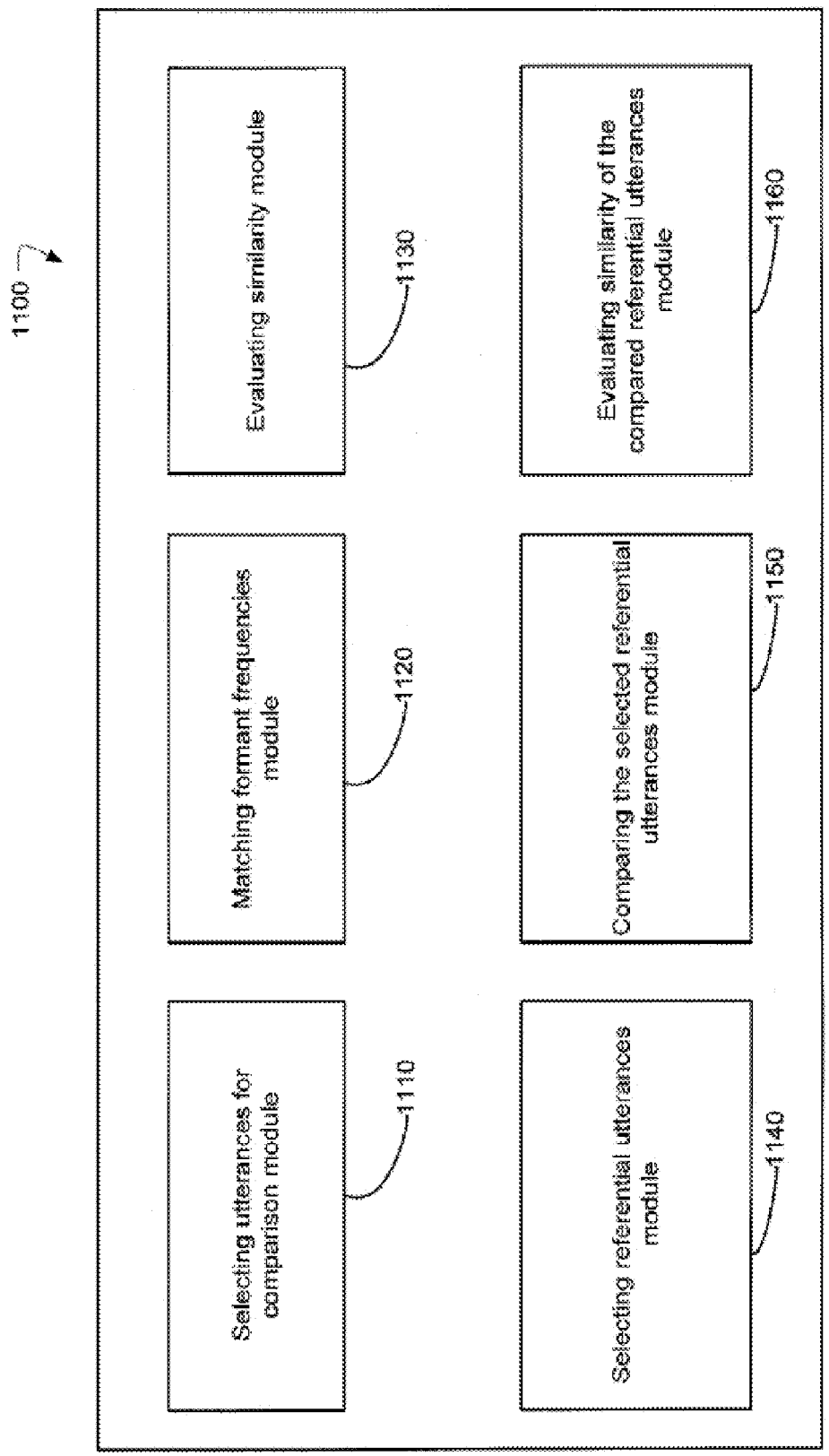
FIG. 11 is a diagram of an example of one embodiment of a system for identification of a speaker by phonograms of spontaneous oral speech.

Referring to FIG. 11, a system 1100 identifying a speaker by phonograms of oral speech will be described. The system 1100 includes several modules that may be executed or performed via hardware, computer software, combinations of hardware and software, firmware operating on hardware, or other similar means, and may include a program operating on a computing device shown in FIG. 9, for example. Module 1110 of system 1100 selects utterances for comparison, such as from a first phonogram and a second phonogram. Module 1120 matches formant frequencies, such as in referential utterances of a speech signal. Module 1130 evaluates similarity, such as between a first phonogram of the speaker and a second, or sample, phonogram. Module 1140 selects referential utterances, such as of speech signals from the first phonogram and the second phonogram, where the referential utterances can comprise formant paths of at least three formant frequencies in certain embodiments. Module 1150 compares between the selected referential utterances, which may comprise at least two identical formant frequencies in certain embodiments. Module 1160 evaluates similarity of the compared referential utterances from matching other formant frequencies, where similarity of the phonograms can be determined from evaluation of similarity of all compared referential utterances in certain embodiments.

Although the present inventions have been illustrated by reference to specific embodiments, it will be apparent to those skilled in the art that the inventions are not limited to the details of the foregoing illustrative embodiments, and that the present inventions may be embodied with various changes and modifications without departing from the scope thereof. The present embodiments are therefore to be considered in all respects as illustrative and not restrictive, the scope of the inventions being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A method for identification of a speaker by phonograms of oral speech, the method comprising:

Selecting, via a computing device, referential utterances of speech signals from a first phonogram of the speaker and a second, or sample, phonogram, wherein the referential utterances comprise formant paths of at least three formant frequencies, and values of the first two formants of the formant paths are within given typical variability limits of formant frequency values for a specific type of vowel phoneme in a given language;

Comparing, via the computing device, out of the selected referential utterances those selected referential utterances comprising at least two formant frequencies having the same values;

and evaluating, via the computing device, similarity of the compared referential utterances on the basis of comparison of other formant frequencies out of the at least three formant frequencies, wherein similarity of the phonograms is determined from evaluation of similarity of all the compared referential utterances.

2. The method according to claim 1, wherein the formant frequencies in each of the selected referential utterance are calculated as average values for fixed time intervals in which the formant frequencies are relatively constant.

3. The method according to claim 1, wherein the selection from the phonograms for comparison is conducted in relation to at least two referential utterances of a speech signal related to sounds articulated as differently as possible with maximum and minimum frequency values for the first and the second formants in the given phonogram.

4. The method according to claim 1, wherein,
before calculating values of formant frequencies,
subjecting a power spectrum of the speech signal for each phonogram to inverse filtering,
wherein the time average for each frequency component of the power spectrum is calculated, at least for particular utterances of the phonogram, and then
a power spectrum of the phonogram for each frequency component of the spectrum is divided by its inverse mean value.

5. The method according to claim 1, wherein, before calculating values of formant frequencies,
subjecting a power spectrum of a speech signal for each phonogram to inverse filtering,
wherein the time average for each frequency component of the power spectrum is calculated, at least for individual utterances of the phonogram, and then
an original value logarithm of the spectra is taken, and an average value logarithm of the phonogram signal power spectrum for each frequency component is subtracted from its original value logarithm.

6. A system for identification of a speaker by phonograms of oral speech, the system comprising:

a computer memory configured to store digital audio signal files representative of a plurality of phonograms converted into digital form; a computing device configured to:

select referential utterances of speech signals from a first phonogram of the speaker and a second, or sample, phonogram, wherein the referential utterances comprise formant paths of at least three formant frequencies, and values of the first two formants of the formant paths are within given typical variability limits of formant frequency values for a specific type of vowel phoneme in a given language;

compare out of the selected referential utterances those selected referential utterances comprising at least two formant frequencies values having the same values; and evaluate similarity of the compared referential utterances on the basis of comparison of other formant frequencies out of the at least three formant frequencies, wherein similarity of the phonograms is determined from evaluation of similarity of all the compared referential utterances.

7. The system according to claim 6, wherein the formant frequencies in each of the selected referential utterance are calculated as average values for fixed time intervals in which the formant frequencies are relatively constant.

8. The system according to claim 6, wherein the selection from the phonograms for comparison is conducted in relation to at least two referential utterances of a speech signal related to sounds articulated as differently as possible with maximum and minimum frequency values for the first and the second formants in the given phonogram.

9. The system according to claim 6, wherein the computing device additionally subjects a power spectrum of the speech signal for each phonogram to inverse filtering before calculating values of formant frequencies, wherein the time average for each frequency component of the power spectrum is calculated, at least for particular utterances of the phonogram, and then a power spectrum of the phonogram for each frequency component of the spectrum is divided by its inverse mean value.

10. The system according to claim 6, wherein the computing device additionally subjects a power spectrum of a speech signal for each phonogram to inverse filtering before calculating values of formant frequencies,
wherein the time average for each frequency component of the power spectrum is calculated, at least for individual utterances of the phonogram, and then
an original value logarithm of the spectra is taken, and an average value logarithm of the phonogram signal power spectrum for each frequency component is subtracted from its original value logarithm.

11. A system for identification of a speaker by phonograms of oral speech, the system comprising:

means for selecting referential utterances of speech signals from a first phonogram of the speaker and a second, or sample, phonogram, wherein the referential utterances comprise formant paths of at least three formant frequencies, and values of the first two formants of the formant paths are within the given typical variability limits of formant frequency values for a specific type of vowel phoneme in a given language;

means for comparing out of the selected referential utterances those selected referential utterances comprising at least two formant frequencies having the same values;

and means for evaluating similarity of the compared referential utterances on the basis of comparison of other formant frequencies out of the at least at least three formant frequencies, wherein similarity of the phonograms is determined from evaluation of similarity of all the compared referential utterances.

12. The system according to claim 11, wherein the formant frequencies in each of the selected referential utterance are calculated as average values for fixed time intervals in which the formant frequencies are relatively constant.

13. The system according to claim 11, wherein the selecting from the phonograms for comparing is conducted in relation to at least two referential utterances of a speech signal related to sounds articulated as differently as possible with maximum and minimum frequency values for the first and the second formants in the given phonogram.

14. The system according to claim 11, additionally comprising means for subjecting a power spectrum of the speech signal for each phonogram to inverse filtering before calculating values of formant frequencies, wherein the time average for each frequency component of the power spectrum is calculated, at least for particular utterances of the phonogram, and then a power spectrum of the phonogram for each frequency component of the spectrum is divided by its inverse mean value.

15. The system according to claim 11, additionally comprising means for subjecting a power spectrum of a speech signal for each phonogram to inverse filtering before calculating values of formant frequencies, wherein the time average for each frequency component of the power spectrum is calculated, at least for individual utterances of the phonogram, and then an original value logarithm of the spectra is taken, and an average value logarithm of the phonogram signal power spectrum for each frequency component is subtracted from its original value logarithm.

* * * * *